(12) United States Patent
Sixt

(10) Patent No.: US 8,680,216 B2
(45) Date of Patent: Mar. 25, 2014

(54) STORAGE-STABLE HARDENER COMPOSITION IN A 2K SYSTEM

(75) Inventor: Torsten Sixt, Mehring (DE)

(73) Assignee: Wacker Chemie AG, Munich (DE)

(*) Notice: Subject to any disclaimer, the term of this patent is extended or adjusted under 35 U.S.C. 154(b) by 117 days.

(21) Appl. No.: 13/174,808

(22) Filed: Jul. 1, 2011

(65) Prior Publication Data

US 2012/0004376 A1   Jan. 5, 2012

(30) Foreign Application Priority Data

Jul. 2, 2010   (DE) .................. 10 2010 030 842

(51) Int. Cl.
*C08G 77/04* (2006.01)
*C08G 77/08* (2006.01)

(52) U.S. Cl.
USPC ........................... 525/474; 528/14

(58) Field of Classification Search
USPC ....................................... 525/474
See application file for complete search history.

(56) References Cited

U.S. PATENT DOCUMENTS

| | | | |
|---|---|---|---|
| 4,490,500 A | 12/1984 | Smith | |
| 5,665,805 A * | 9/1997 | Hatanaka et al. | 524/322 |
| 6,255,373 B1 | 7/2001 | Akamatsu et al. | |
| 6,521,699 B2 | 2/2003 | Feder et al. | |
| 6,774,202 B2 * | 8/2004 | Lee | 528/33 |
| 2008/0251200 A1 | 10/2008 | Kimura et al. | |
| 2010/0081751 A1 | 4/2010 | Blanc-Magnard et al. | |

FOREIGN PATENT DOCUMENTS

| | | |
|---|---|---|
| DE | 32 06 474 A1 | 9/1982 |
| EP | 0787774 A2 | 8/1997 |
| JP | 9268256 A2 | 10/1997 |
| JP | 2008280525 A2 | 11/2008 |
| JP | 2008546882 T2 | 12/2008 |
| JP | 2009132797 A2 | 6/2009 |
| JP | 2009532568 T2 | 9/2009 |
| JP | 2010106210 A2 | 5/2010 |
| WO | 2007117551 A1 | 10/2007 |
| WO | 2010057963 A1 | 5/2010 |

OTHER PUBLICATIONS

Levy, et al (Oxidation Stability of Silicone Elastomers, RDB 07-73 p. 637, Jul. 1, 1973).*

* cited by examiner

*Primary Examiner* — Randy Gulakowski
*Assistant Examiner* — Christopher M Rodd
(74) *Attorney, Agent, or Firm* — Brooks Kushman P.C.

(57) ABSTRACT

Hardener composition for condensation-crosslinking RTV-2 silicone compositions contain:
(A) at least one crosslinker,
(B) at least one catalyst,
(C) at least one extender polymer, wherein the sum of the molar proportions of T and Q units in the extender polymer (C) is at least 25%.

6 Claims, No Drawings

STORAGE-STABLE HARDENER COMPOSITION IN A 2K SYSTEM

CROSS-REFERENCE TO RELATED APPLICATION

This application claims priority to German Patent Application No. DE 10 2010 030 842.0 filed Jul. 2, 2010 which is herein incorporated by reference.

BACKGROUND OF THE INVENTION

1. Field of the Invention

Two-component (2K) silicone compositions have been known for a relatively long time in the prior art and are often used as adhesives and sealants in various applications. Two-component silicones which crosslink at room temperature are referred to as "room temperature vulcanizing 2 part silicones" (RTV-2). One of the two components is frequently referred to as the polymer composition or "A component". The second component is frequently referred to as the hardener composition or else as the "B component".

2. Background Art

In the present-day technology, self-adhesive hardener compositions often comprise silicone polymers as extender polymers. These are usually vinyl- or trimethylsilyl-functional polydimethylsiloxanes. The compatibility of some components, for example, crosslinkers or coupling agents with this polymer is not always sufficiently high, so that there is a risk of phase separation. Such hardener compositions are usually rheologically stabilized, i.e. a paste having a solid consistency is formulated using rheologically active fillers in order to prevent excessively easy demixing. However, in the long term this does not solve the separation problem. Separation of a liquid phase at the surface is well known for many hardener compositions.

Since coupling agents in amounts of about 1% and crosslinkers in amounts of about 3-5% are usually required in ready-to-use, self-adhesive compositions, 2K systems accordingly contain, for example at a 9:1 mixing ratio of the A and B components, about a 10-fold higher concentration in the hardener compositions, which is above the solubility limit of some coupling agents. The problem of phase separation of individual components then becomes very evident.

The term "separation" used here describes a spontaneous separation of components in a mixture or preparation as a result of insufficient compatibility or different densities of the individual components. Depending on the density of the component(s) which separate out, accumulations on either the surface or bottom can usually be observed.

This feature can also be described by means of the term "homogeneity", i.e. the material uniformity. Accordingly, mixtures or preparations in which a phase different from the major part of the composition is formed are referred to as inhomogeneous. This can be, for example, separation of an oily or liquid component on a paste. In the case of liquid mixtures, it can be the visible formation of a phase boundary between insoluble or incompatible components.

WO 2010/057963 A1 discloses a B component which may contain vinyl-terminated polydimethylsiloxanes and, for example, carbon black and silica for rheological stabilization, and additionally contains crosslinkers and coupling agents. However, this additional rheological stabilization merely delays the point in time at which separation of constituents of the hardener composition occurs.

US 2010/081751 A1 describes RTV-2 compositions in which the crosslinker component can contain a linear, unreactive polydimethylsiloxane or copolymer. Here too, separation of the hardener composition is merely delayed.

In DE 32 06 474 A1, the constituents of the B component, alkyl silicate, catalyst and coupling agent, are reacted in a prior reaction in order to achieve compatibility of the components. This has the disadvantage that a complicated, additional, chemical process has to be carried out.

SUMMARY OF THE INVENTION

It was therefore an object of the present invention to provide hardener compositions for 2K silicone compositions, which remain homogeneous upon storage and display no separation, without having to be chemically reacted or rheologically stabilized in a complicated manner beforehand in an additional process step. These and other objects are achieved by a hardener composition for condensation-crosslinking RTV-2 silicone compositions comprising:
(A) at least one crosslinker,
(B) at least one catalyst, and
(C) at least one extender polymer, wherein the sum of the molar proportions of T and Q units in (C) is at least 25%.

DETAILED DESCRIPTION OF THE PREFERRED EMBODIMENTS

The hardener composition of the invention is used together with a polymer composition as the second component in RTV-2 systems. Such polymer compositions for RTV-2 systems have long been known to those skilled in the art. They usually contain hydroxy-terminated polydimethylsiloxanes as crosslinkable polymers, usually trimethylsilyl-terminated polydimethylsiloxanes as a plasticizer component, and reinforcing or non-reinforcing fillers such as silica, carbon black, quartz, chalk, diatomaceous earth, etc. Optional components such as heat stabilizers, additives for optimizing rheology or other specific properties, fungicides, etc. are also used.

The crosslinkers (A) used according to the invention are preferably organosilicon compounds of the general formula (I)

$$Z_c SiR^2_{(4-c)} \qquad (I),$$

where
the radicals $R^2$ are each, independently of one another, monovalent, optionally substituted hydrocarbon radicals which can be interrupted by oxygen atoms,
the radicals Z can be identical or different and are, independently of one another, hydrolyzable radicals, and
c is 3 or 4,
and also partial hydrolysates thereof.

Although not indicated in formula (I), the organosilicon compounds used as crosslinkers can, as a result of the method of production, have a small proportion of hydroxyl groups, preferably up to a maximum of 5% of all Si-bonded radicals.

The partial hydrolysates can be partial homohydrolysates, i.e. partial hydrolysates of one type of organosilicon compound of the general formula (I), and also partial cohydrolysates, i.e. partial hydrolysates of at least two different types of organosilicon compounds of the general formula (I). These crosslinkers or partial hydrolysates according to the invention have a maximum weight average molecular weight (Mw) of 1200 g/mol. If the crosslinkers (A) used in the compositions of the invention are partial hydrolysates of organosilicon compounds of the formula (I), partial hydrolysates having up to 10 silicon atoms are preferred.

The radicals $R^2$ are preferably monovalent hydrocarbon radicals which have from 1 to 18 carbon atoms and are optionally substituted by halogen atoms, amino groups, ether groups, ester groups, epoxy groups, mercapto groups, cyano groups or (poly)glycol radicals, where the latter are made up of oxyethylene and/or oxypropylene units, more preferably alkyl radicals having from 1 to 12 carbon atoms, and in particular the methyl radical. However, radicals $R^2$ can also be divalent radicals which, for example, join two silyl groups to one another.

Examples of radicals $R^2$ are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl or 2-propenyl radicals; aryl radicals such as the phenyl, naphthyl, anthryl or phenanthryl radical; alkaryl radicals such as o-, m-, and p-tolyl radicals, xylyl radicals and ethylphenyl radicals; and aralkyl radicals such as the benzyl radical, and the $\alpha$- and $\beta$-phenylethyl radicals.

Examples of substituted radicals $R^2$ are methoxyethyl, ethoxyethyl and ethoxyethoxyethyl radicals. Examples of divalent radicals $R^2$ are polyisobutylenediyl radicals and propanediyl-terminated polypropylene glycol radicals. As radicals $R^2$, preference is given to hydrocarbon radicals having from 1 to 12 carbon atoms, most preferably the methyl and vinyl radicals.

Examples of radicals Z are all known hydrolyzable radicals such as optionally substituted hydrocarbon radicals bound via an oxygen atom or nitrogen atom to the silicon atom. The radical Z is preferably an —$OR^1$ radical, where $R^1$ is a substituted or unsubstituted hydrocarbon radical which may be interrupted by oxygen atoms. Examples of Z are methoxy, ethoxy, n-propoxy, i-propoxy, n-butoxy, i-butoxy, s-butoxy, tert-butoxy and 2-methoxyethoxy radicals, amino radicals such as the methylamino, dimethylamino, ethylamino, diethylamino and cyclohexylamino radicals, amido radicals such as the N-methylacetamido and benzamido radicals, aminoxy radicals such as the diethylaminoxy radical, oximo radicals such as the dimethylketoximo, methylethylketoximo and methylisobutylketoximo radicals, and enoxy radicals such as the 2-propenoxy radical and also acyloxy radicals such as acetyl groups.

The crosslinkers (A) are preferably tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 1,2-bis(trimethoxysilyl)pethane, 1,2-bis(triethoxysilyl)pethane and also partial hydrolysates of the organosilicon compounds mentioned, e.g. hexaethoxydisiloxane.

The crosslinkers (A) are most preferably tetramethoxysilane, tetraethoxysilane, tetrapropoxysilane, methyltrimethoxysilane, methyltriethoxysilane, vinyltrimethoxysilane, vinyltriethoxysilane, phenyltrimethoxysilane, 1,2-bis(trimethoxysilyl)ethane, 1,2-bis(triethoxysilyDethane and also partial hydrolysates thereof, in particular tetraethoxysilane, 1,2-bis(triethoxysilyl)pethane, vinyltriethoxysilane and partial hydrolysates and cohydrolysates thereof.

The crosslinkers (A) are commercial products or can be prepared by methods known in silicon chemistry, and are used in such amounts that an at least two-fold molar excess of hydrolyzable or hydrolyzed crosslinker functions based on the end group content of the constituents to be crosslinked is obtained. Preference is given to setting a molar ratio of crosslinker functions to the groups to be crosslinked of from 2:1 to 10:1.

Suitable catalysts (B) according to the invention are in principle all previously known catalysts for the condensation reaction, for example dialkyltin compounds, organotitanates or chelate complexes of titanium, and also, for example, cerium, zirconium, molybdenum, manganese, copper or zinc compounds or salts thereof, alkoxylates or chelate complexes, and also catalytically active compounds of the main groups or salts of bismuth, Li, Sr or B. Preference is given to the metal compounds of cerium, zirconium, bismuth, lithium and diorganotin as catalyst (B). Particular preference is given to the corresponding carboxylates.

The catalyst (B) is present in the hardener compositions of the invention in the amounts usual for the condensation reaction. In ready-to-use 2K systems, these are, present in the case of tin compounds, for example, in an amount in the range 100-500 ppm, in the case of Li compounds in the range 100-1000 ppm and in the case of bismuth compounds in the range 2000-5000 ppm, in each case based on the metal.

The component (C) is added to the hardener composition in order to be able to adjust the mixing ratio of the hardener composition with the polymer composition in an RTV-2 system more readily and to make all constituents miscible. Component (C) thus serves to increase the volume of the hardener composition, which makes better control of metering during mixing possible and ensures homogeneity of the mixture.

Extender polymers (C) are organosilicon compounds whose chemical composition corresponds to the general formula (II)

$$(T+Q)/(M+D+T+Q) \geq 0.25 \tag{II}$$

The nomenclature of the formula (II) is in accord with general knowledge in the art, according to which M units correspond to monofunctional silicon atoms, D units correspond to difunctional silicon atoms, T units correspond to trifunctional silicon atoms and Q units correspond to tetrafunctional silicon atoms. Branched extender polymers contain, as a result of the process of production, silicon-bonded hydroxyl groups in amounts of less than 1% by weight based on 100 parts of the branched polymer. The component (C) preferably has an OH radical content of less than 0.5% by weight, most preferably less than 0.2% by weight.

The sum of the molar proportions of T and Q units in the carrier or extender polymer (C) is preferably at least 25% of the silicon atoms. Particular preference is given to at least 35% and in particular at least 40%. The use of the extender polymer (C) unexpectedly provides good compatibility, even with more polar components.

The average molecular weight (Mw) of component (C) preferably ranges from $\geq 1200$ g/mol to 5000 g/mol.

The hardener compositions of the invention can contain coupling agents (D) as a further component. Coupling agents are viewed as functional silanes. Examples of coupling agents (D) are silanes and organopolysiloxanes having functional groups, for example those having glycidoxy, amino or methacryloxy radicals. Furthermore, silanes having hydrolyzable groups and SiC-bonded vinyl, acryloxy, methacryloxy, epoxy, acid anhydride, acid, ester, cyanurato-, carbamato- or ureido-functional or ether groups and also partial hydrolysates and cohydrolysates thereof can also be used as coupling agents (D). Preferred coupling agents are amino-, acryl-, epoxy-, cyanurato-, carbamato- or ureido-functional silanes having hydrolyzable groups and partial hydrolysates thereof.

Component (D) is preferably present in such amounts that a proportion of up to 50 parts by weight, more preferably from 0.1 to 20 parts by weight, and in particular from 0.5 to 10 parts by weight, of (D) is present per 100 parts by weight of the catalyzed, ready-to-use RTV-2 mixture (=hardener composition +polymer composition).

In addition, the hardener composition can contain further constituents (E) which have long been known to those skilled in the art. Examples of (E) which can be used in the compositions of the invention are fillers such as reinforcing and nonreinforcing fillers, plasticizers, soluble dyes, inorganic and organic pigments, solvents, fungicides, fragrances, dispersants, rheological additives, corrosion inhibitors, oxidation inhibitors, light stabilizers, heat stabilizers, flame retardants and agents for influencing the electrical properties.

The indicated amounts of coupling agent (D) may exceed, depending on the type of coupling agent, the solubility of the coupling agent in linear polydimethylsiloxane polymers, which inevitably leads to phase separation. This separation tendency is suppressed by the use of component (C) according to the invention without further rheologically active substances such as silica, carbon black or other thickening additives having to be used. An additional process step comprising a complicated chemical reaction of the hardener composition is also not necessary. A further advantage of the hardener composition of the invention is that the use of the component (C) according to the invention helps to set the metering ratios of hardener composition and polymer composition which are usual in practical use.

The hardener composition can be produced, for example, by mixing the individual components (A), (B) and (C). The further components (D) and (E) are likewise mixed in when required.

The hardener composition of the invention is used as a component in condensation-crosslinking RTV-2 silicone compositions. These condensation-crosslinking RTV-2 silicone compositions in turn, may be employed, for example, as adhesives and sealants in various applications.

EXAMPLES

Examples of the Production of Hardener Components

Comparative Example C1 (Analogous to DE 32 06 474 A1)

10.8 parts of tetraethyl silicate were firstly reacted with 3.6 parts of dibutyltin dilaurate at 140° C. for 2 hours as described in Example 1 of the abovementioned document. 25.6 parts of aminopropyltriethoxysilane were subsequently added. This was compounded with 7 parts of hydrophobicized silica, 28 parts of chalk and 25 parts of a vinyl-functional polymer having a viscosity of 20,000 mPas to give a hardener component.

Comparative Example C2 (Analogous to WO 2010/057963 A1)

A hardener mixture was produced as per the description of the abovementioned document by premixing 20 parts of a vinyl polymer having a viscosity of 20,000 mPas with 32 parts of tetraethyl silicate, 10 parts of aminopropyltriethoxysilane as the coupling agents. 17 parts of silica (HDK H15) and 20 parts of carbon black (Ensaco MS) were subsequently mixed in and processed to give a homogeneous composition.

Example 3

54 parts of a resin component containing 75% of T units and 25% of D units and having a weight average molecular weight of 2800 g/mol were mixed with 15 parts of partially hydrolyzed tetraethyl silicate TES40, 15 parts of 3-aminopropyltriethoxysilane, 15 parts of Wacker AMS70 (3-aminopropyltriethoxysilane) and 1 part of dibutyltin diacetate to give a homogeneous, clear mixture.

Example 4

44 parts of a resin component containing 75% of T units and 25% of D units and having a weight average of 2800 g/mol were homogeneously mixed with 15 parts of a partially hydrolyzed tetraethyl silicate TES40, 15 parts of 3-aminopropyltriethoxysilane, 15 parts of Wacker AMS70 and 10 parts of carbon black (Ensaco MS), and subsequently catalyzed with 1 part of dibutyltin diacetate.

Comparative Example C5

54 parts of a resin component containing 20% of T units, 70% of D units and 10% of M units and having a weight average of 2000 g/mol were homogeneously mixed with 15 parts of a partially hydrolyzed tetraethyl silicate TES40, 15 parts of 3-aminopropyltriethoxysilane, 15 parts of Wacker AMS70, and subsequently catalyzed with 1 part of dibutyltin diacetate.

Example 6

54 parts of a resin component containing 100% of T units and having a weight average of 2500 g/mol were homogeneously mixed with 15 parts of a partially hydrolyzed tetraethyl silicate TES40, 15 parts of 3-aminopropyltriethoxysilane, 15 parts of Wacker AMS70, and subsequently catalyzed with 1 part of dibutyltin diacetate.

Example 7

54 parts of a resin component containing 40% of Q units and 60% of M units and having a weight average of 1500 g/mol were homogeneously mixed with 15 parts of a partially hydrolyzed tetraethyl silicate TES40, 15 parts of 3-aminopropyltriethoxysilane, 15 parts of Wacker AMS70, and subsequently catalyzed with 1 part of dibutyltin diacetate.

Example 8

54 parts of a resin component containing 10% of Q units, 15% of T units and 65% of D units and also 10% of M units and having a weight average of 2200 g/mol were homogeneously mixed with 15 parts of a partially hydrolyzed tetraethyl silicate TES40. 15 parts of 3-aminopropyltrictthoxysilane. 15 parts of Wacker AMS70, and subsequently catalyzed with 1 part of dibutyltin diacetate.

The assessment of separation in the examples was carried out after 3 months under standard conditions (at room temperature, about 25° C., and atmospheric pressure, about 1015 mPa) and after 4 weeks at elevated temperatures (50° C.) and atmospheric pressure and is reported in Table 1.

TABLE 1

| Example | C1 | C2 | 3* | 4* | 5 | 6* | 7* | 8* |
|---|---|---|---|---|---|---|---|---|
| Consistency | S | S | L | S | L | L | L | L |
| Separation of the hardener mixture after 4 weeks at 50° C. | yes** | yes | no | no | yes | no | no | no |
| Separation of the hardener mixture after 3 months under standard conditions | yes** | yes | no | no | yes | no | no | no |
| Vulcanization using EL RT 774 after 72 h | good | good | good | good | good | good | good | good |

Abbreviations used in Table 1:
S = paste having a solid consistency
L = liquid
*according to the invention
** see DE 32 06 474 A1 page 37, penultimate paragraph In the case of the examples according to the invention, no recognizable inhomogeneity of the hardener component occurs.

Comparative Example C1 contains a reaction product of crosslinker and catalyst in order to make catalyst, hardener and coupling agent compatible with the other components without use of solvents. Oil separation is nevertheless observed.

In Comparative Example C2, separation of the mixture in the form of separation of oil at the surface is also observed.

Examples 3, 4, 6, 7 and 8 which are inventive and have a proportion of T or Q units of at least 25% display no separation of oil. The hardener preparations 3, 5, 6, 7 and 8 are clear to slightly turbid liquids. Note, that Comparative Example 5, which employs an extender polymer having less than 25% of Q and T Units, displays phase separation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A condensation-crosslinking two-component RTV-2 silicone composition, wherein one of the two components is a hardener composition comprising:
   (A) at least one crosslinker which is an organosilicon compound of the formula (I)

$$Z_cSiR^2{}_{(4-c)} \qquad (I),$$

where
   the radicals $R^2$ are identical or different and are, independently of one another, monovalent, optionally substituted hydrocarbon radicals optionally interrupted by oxygen atoms,
   the radicals Z are identical or different and are, independently of one another, hydrolyzable radicals, and
   c is 3 or 4,
   and also partial hydrolysates thereof,
   (B) at least one catalyst selected from the group consisting of carboxylates of cerium, zirconium, bismuth, and lithium,
   (C) at least one extender polymer which is an organosilicon compound whose chemical composition corresponds to the formula (II)

$$(T+Q)/(M+D+T+Q) \geq 0.25 \qquad (II)$$

wherein
   M units correspond to monofunctional silicon atoms,
   D units correspond to bifunctional silicon atoms,
   T units correspond to trifunctional silicon atoms,
   Q units correspond to tetrafunctional silicon atoms,
   wherein extender polymer (C) contains no Q units.

2. A method of producing the hardener composition of claim 1, comprising mixing the components (A), (B) and (C).

3. An adhesive or sealant, comprising a condensation-crosslinking RTV-2 silicone composition of claim 1.

4. A condensation-crosslinking two-component RTV-2 silicone composition, wherein one of the two components is a hardener composition comprising:
   (A) at least one crosslinker which is an organosilicon compound of the formula (I)

$$Z_cSiR^2{}_{(4-c)} \qquad (I),$$

where
   the radicals $R^2$ are identical or different and are, independently of one another, monovalent, optionally substituted hydrocarbon radicals optionally interrupted by oxygen atoms,
   the radicals Z are identical or different and are, independently of one another, hydrolyzable radicals, and
   c is 3 or 4,
   and also partial hydrolysates thereof,
   (B) at least one catalyst selected from the group consisting of carboxylates of cerium, zirconium, bismuth, and lithium,
   (C) at least one extender polymer which is an organosilicon compound whose chemical composition corresponds to the formula (II)

$$(T+Q)/(M+D+T+Q) \geq 0.25 \qquad (II)$$

wherein
   M units correspond to monofunctional silicon atoms,
   D units correspond to bifunctional silicon atoms,
   T units correspond to trifunctional silicon atoms,
   Q units correspond to tetrafunctional silicon atoms,
   wherein at least one extender polymer contains both T and Q units.

5. A method of producing the hardener composition of claim 4, comprising mixing the components (A), (B), and (C).

6. An adhesive or sealant, comprising a condensation-crosslinking RTV-2 silicone composition of claim 4.

* * * * *